(12) United States Patent
Beck et al.

(10) Patent No.: US 9,245,333 B1
(45) Date of Patent: Jan. 26, 2016

(54) SYSTEMS AND METHODS FOR DETECTING OBSTRUCTIONS WITHIN THE FIELD-OF-VIEW OF AN IMAGE SENSOR

(71) Applicant: SEMICONDUCTOR COMPONENTS INDUSTRIES, LLC, Phoenix, AZ (US)

(72) Inventors: Jeffery Beck, Philomath, OR (US); Charles McCord, Corvallis, OR (US)

(73) Assignee: Semiconductor Components Industries, LLC, Phoenix, AZ (US)

( * ) Notice: Subject to any disclaimer, the term of this patent is extended or adjusted under 35 U.S.C. 154(b) by 0 days.

(21) Appl. No.: 14/566,434

(22) Filed: Dec. 10, 2014

(51) Int. Cl.
*B60Q 1/00* (2006.01)
*H04N 7/18* (2006.01)
*G06T 7/00* (2006.01)
*B60S 1/08* (2006.01)
*B60Q 1/14* (2006.01)
*G06K 9/00* (2006.01)

(52) U.S. Cl.
CPC ............ *G06T 7/0002* (2013.01); *B60S 1/0844* (2013.01); *B60Q 1/0023* (2013.01); *B60Q 1/143* (2013.01); *B60Q 2300/146* (2013.01); *G06K 9/00791* (2013.01)

(58) Field of Classification Search
None
See application file for complete search history.

(56) References Cited

U.S. PATENT DOCUMENTS

| | | | |
|---|---|---|---|
| 5,883,739 A * | 3/1999 | Ashihara et al. | 359/462 |
| 5,923,027 A | 7/1999 | Stam et al. | |
| 6,097,024 A | 8/2000 | Stam et al. | |
| 6,144,022 A | 11/2000 | Tenenbaum et al. | |
| 6,207,967 B1 | 3/2001 | Hochstein | |
| 6,262,410 B1 | 7/2001 | Stam et al. | |
| 6,429,933 B1 | 8/2002 | Jackson | |
| 6,469,291 B2 | 10/2002 | Bauer et al. | |
| 6,495,815 B1 | 12/2002 | Stam et al. | |
| 6,603,137 B2 | 8/2003 | Hochstein | |
| 6,614,043 B2 | 9/2003 | Hochstein | |
| 6,617,564 B2 | 9/2003 | Ockerse et al. | |
| 6,681,163 B2 | 1/2004 | Stam et al. | |
| 6,768,422 B2 | 7/2004 | Schofield et al. | |
| 6,806,452 B2 | 10/2004 | Bos et al. | |
| 6,853,897 B2 | 2/2005 | Stam et al. | |
| 6,861,636 B2 | 3/2005 | Ockerse et al. | |
| 6,946,639 B2 | 9/2005 | Stam et al. | |
| 7,196,305 B2 * | 3/2007 | Shaffer et al. | 250/208.1 |
| 7,199,346 B2 | 4/2007 | Stam et al. | |
| 7,218,757 B2 | 5/2007 | Franz | |
| 7,248,344 B2 * | 7/2007 | Morcom | 356/10 |
| 7,319,777 B2 * | 1/2008 | Morcom | 382/104 |
| 7,361,875 B2 | 4/2008 | Bechtel et al. | |
| 7,609,857 B2 * | 10/2009 | Franz | 382/104 |
| 7,612,356 B2 | 11/2009 | Utida et al. | |
| 8,427,395 B2 * | 4/2013 | Seder et al. | 345/7 |
| 8,553,088 B2 * | 10/2013 | Stein et al. | 348/148 |
| 2011/0280026 A1 * | 11/2011 | Higgins-Luthman | B60Q 1/143 362/466 |
| 2013/0038736 A1 * | 2/2013 | Yamamura | B60Q 1/143 348/148 |
| 2013/0151427 A1 * | 6/2013 | Whelan et al. | 705/317 |
| 2013/0158796 A1 * | 6/2013 | Higgins-Luthman | 701/36 |

* cited by examiner

*Primary Examiner* — Jerrah Edwards
*Assistant Examiner* — Demetra Smith-Stewart
(74) *Attorney, Agent, or Firm* — Treyz Law Group, P.C.; Joseph F. Guihan (57) ABSTRACT

An imaging system may include an image sensor and a transparent protective layer formed within the field-of-view of the image sensor. The imaging system may include a light source that emits light in a predetermined pattern. The imaging system may include circuitry that may detect a reflected version of the predetermined pattern of light in image data captured by image sensor. In response, the imaging system may determine an obstruction is present within the field-of-view of the image sensor. The obstruction may be located on the transparent protective layer and may be within 10 centimeters of the image sensor. The light source and image sensor may be located in the interior of a vehicle and oriented to face the exterior of the vehicle. The imaging system may use the image data captured by the image sensor to perform vehicle assist functions for the vehicle.

16 Claims, 3 Drawing Sheets

SYSTEMS AND METHODS FOR DETECTING OBSTRUCTIONS WITHIN THE FIELD-OF-VIEW OF AN IMAGE SENSOR

BACKGROUND

This relates generally to imaging systems and, more particularly, to imaging systems having image verification circuitry.

Modern electronic devices such as cellular telephones, cameras, and computers often use digital image sensors. Imagers (i.e., image sensors) may be formed from a two-dimensional array of image sensing pixels. Each pixel receives incident photons (light) and converts the photons into electrical signals.

Image sensors are often used in automotive applications. In automotive imaging applications, it has become imperative that image sensors comply with certain regulatory safety standards such as the ISO 26262 road vehicle functional safety standard. In order to comply with such types of industry safety standards, automotive image sensors typically perform self-checking procedures to determine whether the image sensor is operating properly. In particular, it is often desirable to be able to determine whether a lens associated with an image sensor is operating properly. However, in conventional automotive image sensors, it can be difficult or impossible to impose a known scene through the lens of the image sensor while the image sensor is embedded within the automobile. This can make it difficult for the automotive imaging system to determine whether the lens has been accidentally or maliciously compromised.

It would therefore be desirable to provide imaging systems with improved capabilities for verifying proper imaging functionality.

DETAILED DESCRIPTION

Imaging systems having digital camera modules are widely used in electronic devices such as digital cameras, computers, cellular telephones, and other electronic devices. A digital camera module may include one or more image sensors that gather incoming light to capture an image.

In some situations, imaging systems may form a portion of a larger system such as a surveillance system or a safety system for a vehicle (e.g., an automobile, a bus, or any other vehicle). In a vehicle safety system, images captured by the imaging system may be used by the vehicle safety system to determine environmental conditions surrounding the vehicle. As examples, vehicle safety systems may include systems such as a parking assistance system, an automatic or semi-automatic cruise control system, an auto-braking system, a collision avoidance system, a lane keeping system (sometimes referred to as a lane drift avoidance system), etc. In these scenarios, image data captured by the imaging system are used by the vehicle safety system for performing automotive functions (e.g., functions associated with the mechanical operation of the automobile that may or may not be associated with ensuring the safety of the automobile and/or the safety of objects in the vicinity of the automobile). In at least some instances, an imaging system may form part of a vehicle safety system for a semi-autonomous or autonomous self-driving vehicle.

The vehicle safety system may include computing equipment (e.g., implemented on storage and processing circuitry having volatile or non-volatile memory and a processor such as a central processing system or other processing equipment) and corresponding drive control equipment that translates instructions generated by the computing equipment into mechanical operations associated with driving the vehicle. For example, the drive control equipment may actuate mechanical systems associated with the vehicle in response to control signals generated by the vehicle safety system. The vehicle safety system may process the image data to generate the control signals such that the control signals are used to instruct the drive control equipment to perform desired mechanical operations associated with driving the vehicle. For example, the drive control system may adjust the steering wheels of the vehicle so that the vehicle turns in a desired direction (e.g., for performing a parking assist function in which the vehicle is guided by the vehicle safety system into a parking spot, for performing lane assist functions in which the steering wheel is automatically adjusted to maintain the vehicle's course between road lane markers), may control the engine (motor) of the vehicle so that the vehicle has a certain speed or so that the vehicle moves forwards or in reverse with a desired engine power (e.g., the drive control system may adjust a throttle of the vehicle so that the vehicle maintains a desired distance with respect to another vehicle in front of the vehicle, etc.), may adjust braking systems associated with the vehicle (e.g., may actuate a parking brake, anti-lock brakes, etc.), or may perform any other mechanical operation associated with movement of the vehicle. The vehicle safety system may perform hazard detection operations that detect objects to the side of, in front of, and/or behind the vehicle that warn the driver of the hazard (e.g., via an alarm or display) and/or that automatically adjust the movement of the vehicle (e.g., by controlling the drive system) to avoid the detected hazard or object. Functions performed by the vehicle safety system for maintaining the safety of the vehicle (e.g., by controlling the drive control system) may sometimes be referred to herein as vehicle safety operations or vehicle safety functions.

Regulatory standards imposed by a regulating body such as vehicle safety standards may require that the proper operation of any component of a vehicle safety system (including imaging system components) be verified before, during, and/or after operation of the corresponding vehicle. Verification operations for imaging system components may be performed by the imaging system prior to and/or after operation of a vehicle (e.g., upon startup and/or shutdown of the imaging system). In these verification operations, concurrent operation of the imaging system and the verification operations may not be required. However, it may be desirable to continuously monitor the status of imaging system components during operation of the imaging system, particularly in situations in which vehicle safety may be influenced by the quality of imaging data provided by the imaging system. Imaging systems may be provided with this type of on-the-fly (e.g., real-time) verification capability.

Image sensors such as those implemented in an imaging system of a vehicle safety system may include one or more arrays of image pixels. The pixels in the array may include photosensitive elements such as photodiodes that convert the incoming light into electric charge. Pixel arrays may have any number of pixels (e.g., hundreds or thousands or more). A typical image sensor may, for example, have hundreds, thousands, or millions of pixels (e.g., megapixels). If desired, each pixel may have an associated microlens (and color filter element) formed over that pixel. The pixel array may additionally have a cover lid that protects the pixel array from external particles such as dust or fingerprints. When an image sensor is incorporated within an automobile or other vehicle, the image sensor may be located behind an additional protective layer that protects the image sensor from damage during operation of the vehicle (e.g., a window or windshield of the vehicle or some other protective covering for the image sensor).

In automotive imaging applications, it is common for image sensors to become obstructed from the scene that they are intended to capture. For example, the automobile may attract dirt, mud, rain, oil, or other debris during normal operation of the automobile that can obstruct the field-of-view of an image sensor implemented in an automotive imaging system on the automobile. An image sensor may be formed as part of a camera module that includes a verification system to ensure that the field-of-view of the image sensor is not obstructed. For example, the camera module may include an image sensor and a corresponding light source. The light source may emit light of a specific color or multiple colors in a known pattern. The light source may emit light that is bright enough to reflect from near-field obstructions that obscure the field-of-view of the image sensor such that the image sensor can detect the light reflected off the obstruction. If the image sensor receives light reflected from an obstruction from the light source (e.g., if the received light matches the predetermined color pattern with which the light was emitted by the light source), processing circuitry coupled to the image sensor may determine that a near-field obstruction is present and may take appropriate action. In certain cases, the processing circuitry may disable the driver assist function associated with the obstructed image sensor and/or use input-output devices to alert a driver of the automobile that there is an obstruction. In other cases, the processing circuitry may determine that the obstructed field-of-view is still sufficient for the image sensor to be used in a driver assist function.

Figure 1:
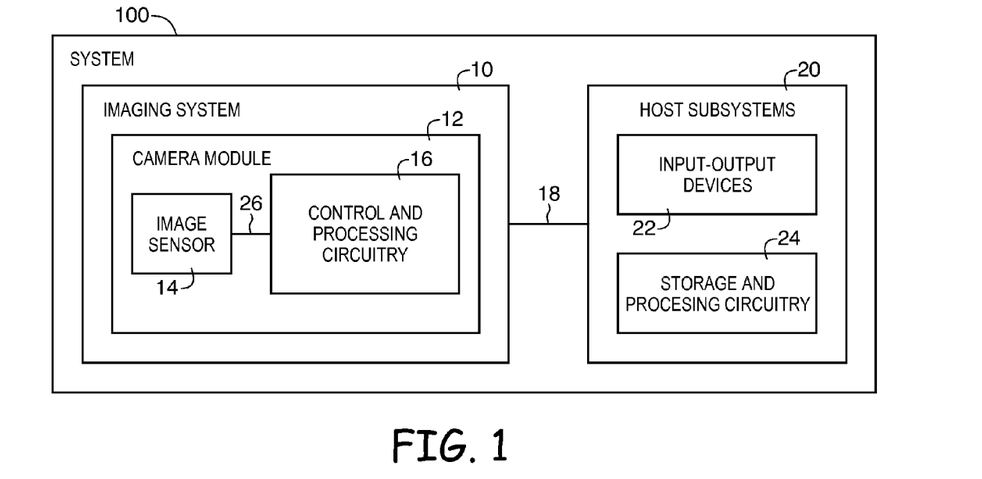
FIG. 1 is a diagram of an illustrative system such as an automotive system that includes an imaging system and a host subsystem in accordance with an embodiment of the present invention.

FIG. 1 is a diagram of an illustrative system having an imaging system that uses an image sensor to capture images and a corresponding host subsystem. System 100 of FIG. 1 may, for example, be a vehicle safety system (e.g., an active braking system or other vehicle safety system), a surveillance system, an electronic device such as a camera, a cellular telephone, a video camera, or other electronic device that captures digital image data.

As shown in FIG. 1, system 100 may include an imaging system such as imaging system 10 and host subsystems such as host subsystem 20. Imaging system 10 may include camera module 12. Camera module 12 may include one or more image sensors 14 and one or more corresponding lenses. The lenses in camera module 12 may, as an example, include M*N individual lenses arranged in an M×N array. Individual image sensors 14 may be arranged in a corresponding M×N image sensor array (as an example). The values of M and N may each be equal to or greater than one, may each be equal to or greater than two, may exceed 10, or may have any other suitable values.

Each image sensor in camera module 12 may be identical or there may be different types of image sensors in a given image sensor array integrated circuit. Each image sensor may be a Video Graphics Array (VGA) sensor with a resolution of 480×640 image sensor pixels (as an example). Other arrangements of image sensor pixels may also be used for the image sensors if desired. For example, images sensors with greater than VGA resolution (e.g., high-definition image sensors), less than VGA resolution and/or image sensor arrays in which the image sensors are not all identical may be used.

During image capture operations, each lens may focus light onto an associated image sensor 14. Image sensor 14 may include photosensitive elements (i.e., pixels) that convert the light into digital data. Image sensors may have any number of pixels (e.g., hundreds, thousands, millions, or more). A typical image sensor may, for example, have millions of pixels (e.g., megapixels). As examples, image sensor 14 may include bias circuitry (e.g., source follower load circuits), sample and hold circuitry, correlated double sampling (CDS) circuitry, amplifier circuitry, analog-to-digital (ADC) converter circuitry, data output circuitry, memory (e.g., buffer circuitry), address circuitry, etc.

Still and video image data from image sensor 14 may be provided to control and processing circuitry 16 via path 26. Control and processing circuitry 16 may be used to perform image processing functions such as data formatting, adjusting white balance and exposure, implementing video image stabilization, face detection, etc. Control and processing circuitry 16 may also be used to compress raw camera image files if desired (e.g., to Joint Photographic Experts Group or JPEG format). In a typical arrangement, which is sometimes referred to as a system on chip (SOC) arrangement, camera sensor 14 and control and processing circuitry 16 are implemented on a common semiconductor substrate (e.g., a common silicon image sensor integrated circuit die). If desired, camera sensor 14 and processing circuitry 16 may be formed on separate semiconductor substrates. For example, camera sensor 14 and processing circuitry 16 may be formed on separate substrates that have been stacked.

Imaging system 10 may convey acquired image data to host subsystem 20 over path 18. In scenarios where system 100 is an automotive imaging system, host subsystem 20 may include an active control system that delivers control signals for controlling vehicle functions such as braking or steering to external devices (e.g., for performing vehicle safety system operations). Host subsystem 20 may include processing software for detecting objects in images, detecting motion of objects between image frames, determining distances to objects in images, filtering or otherwise processing images provided by imaging system 10. Host subsystem 20 may include a warning system configured to disable imaging system 10 and/or generate a warning (e.g., a warning light on an automobile dashboard, an audible warning, or other warning) in the event that verification data associated with an image sensor indicates that the image sensor is not functioning properly.

If desired, system 100 may provide a user with numerous high-level functions. In a computer or advanced cellular telephone, for example, a user may be provided with the ability to run user applications. To implement these functions, host subsystem 20 of system 100 may have input-output devices 22 such as keypads, input-output ports, joysticks, and displays and storage and processing circuitry 24. Storage and processing circuitry 24 may include volatile and nonvolatile memory (e.g., random-access memory, flash memory, hard drives, solid state drives, etc.). Storage and processing circuitry 24 may also include microprocessors, microcontrollers, digital signal processors, application specific integrated circuits, etc.

During operation of imaging system 10, camera module 12 may continuously capture and provide image frames to host subsystem 20. During image capture operations, verification circuitry associated with image sensor 14 may be occasionally operated (e.g., following each image frame capture, following every other image frame capture, following every fifth image frame capture, during a portion of an image frame capture, etc.). Images captured when verification circuitry is operated may include verification data containing verification information. Verification data may be provided to image processing circuitry 16 and/or storage and processing circuitry 24. Image processing circuitry 16 may be configured to compare the verification data to a predetermined data set stored on image processing circuitry 16. Following the comparison, image processing circuitry 16 may send status information or other verification information to host subsystem 20 (e.g., information verifying proper/expected performance of image sensor 14 or information identifying improper performance of image sensor 14).

Figure 2:
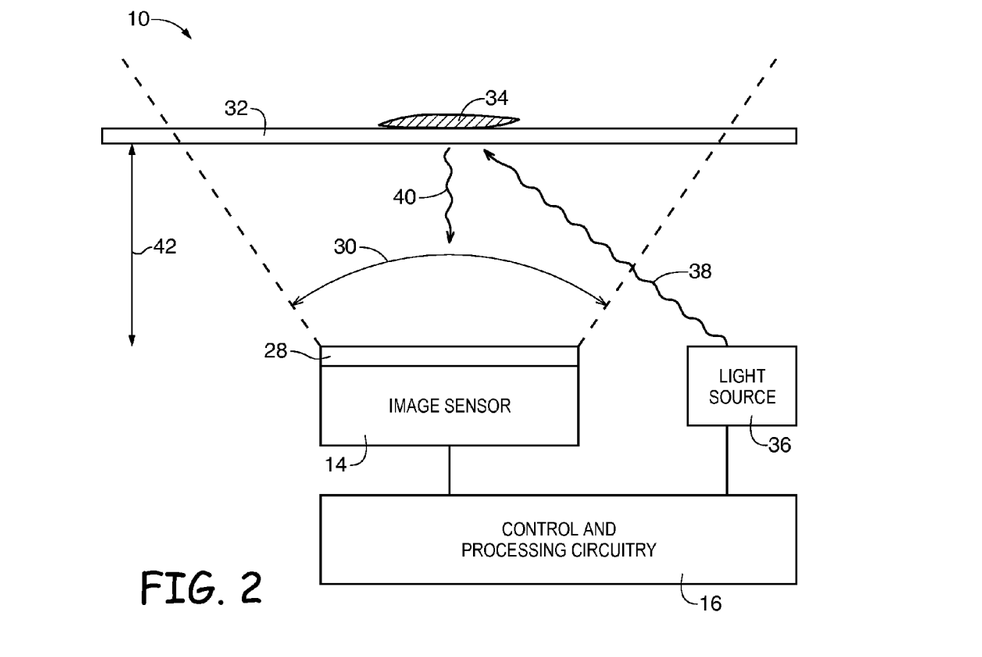
FIG. 2 is a diagram of an illustrative camera module having a light source that is used to detect near-field obstructions of a corresponding image sensor for performing image sensor verification operations in accordance with an embodiment of the present invention.

An example of an arrangement for imaging system 10 is shown in FIG. 2. As shown in FIG. 2, imaging system 10 includes image sensor 14, control and processing circuitry 16, and light source 36. Image sensor 14 may include a pixel array with hundreds, thousands, or millions of pixels arranged in rows and columns. Image sensor 14 may have a cover lid 28 that covers the pixel array. Cover lid 28 may include any desired transparent material through which image sensor 14 receives image light. Cover lid 28 may be, for example, formed from glass, plastic, plexiglass, polymer, or any other desired material. Cover lid 28 may prevent dust and particles from reaching pixel array 28 and negatively affecting the quality of image obtained by image sensor 14.

In scenarios where image sensor 14 is mounted within the interior of a vehicle, protective layer 32 may be used in a vehicle to separate the image sensor from the exterior of the vehicle. Protective layer 32 may be made of a transparent material to allow image sensor 14 to capture accurate images of the surroundings of the vehicle. Protective layer 32 may be formed from glass, plastic, plexiglass, or any other desired material, for example. Protective layer 32 may prevent external particles such as dirt and dust from reaching the interior of the vehicle. However, because protective layer 32 is exposed to the exterior of the vehicle, it is prone to being obstructed by external elements such as dirt, dust, mud, oil, rain, snow, or insects. This example is merely illustrative. If desired, cover lid 28 and/or protective layer 32 may be omitted. Light source 36 may be formed behind lid 28 (e.g., to detect near-field obstructions on lid 28).

Image sensor 14 may have a field-of-view 30. Image sensor 14 may generate image data in response to light received from field-of-view 30. Field-of-view 30 may be any desirable size and shape and may depend on the specific implementation of image sensor 14. During operation of system 10 (e.g., during operation of an automobile on which system 10 is formed), field-of-view 30 of image sensor 14 may become obstructed by near-field obstruction 34. Obstruction 34 may be, for example, a smudge, oil deposit, fingerprint, dirt, dust, mud, water, or other debris in the field-of-view 30. This near-field obstruction may prevent image sensor 14 from obtaining accurate image data by blocking the scene behind the obstruction. As shown in FIG. 2, near-field obstruction 34 is located on an external surface of protective layer 32. However, this example is merely illustrative. In general, obstruction 34 may be located on cover lid 28, on an interior surface of layer 32, or at other locations within field-of-view 30.

In scenarios where imaging system 10 is used in a vehicle safety system, it may be necessary to verify that imaging system 10 (e.g., including image sensor 14) is functioning properly (e.g., in order to comply with industry regulatory standards for automotive imaging). For example, if near-field obstruction 34 is within field-of-view 30, image sensor 14 may not be able to obtain accurate image data of the vehicle's surroundings, thereby preventing image sensor 14 from functioning properly. This may reduce the effectiveness of the vehicle safety system that implements image sensor 14. It may therefore be desirable to provide improved systems and methods for verifying proper performance of automotive imaging systems.

In the example of FIG. 2, system 10 may include light source 36 for determining if there is a near-field obstruction such as near-field obstruction 34 present within field-of-view 30. As shown in FIG. 2, light source 36 may emit light such as light 38. In the absence of near-field obstruction 34, light 38 may pass through protective layer 32 to the exterior of the vehicle without being captured by image sensor 14. Image sensor 14 may thereby capture image light of the surroundings of vehicle 100 without detecting light 38 when near-field obstruction 34 is not present. However, when an obstruction such as near-field obstruction 34 is present, emitted light 38 may reflect off of near-field obstruction 34 as shown by reflected light 40. Image sensor 14 may detect reflected light 40 within a portion of field-of-view 30. Image sensor 14 and circuitry 16 may process the reflected light to determine that obstruction 34 is present within field-of-view 30.

Control and processing circuitry 16 may be configured to control light source 36 and image sensor 14 (e.g., using corresponding control signals). If desired, processing circuitry 16 may control light source 36 to emit light 38 at one or more predetermined colors (wavelengths). Processing circuitry 16 may receive image data generated by image sensor 14 and may process the image data to determine whether obstruction 34 is present in field-of-view 30. For example, processing circuitry 16 may detect light of the predetermined color(s) in the received image data and may determine that the light was emitted by light source 36 (thereby indicating that obstruction 34 is present).

If desired, control and processing circuitry 16 may control light source 36 to emit light in a predetermined temporal and/or chromatic pattern (e.g., a predetermined intensity and color pattern with respect to time). The predetermined temporal/chromatic pattern may be selected so as to avoid detecting so-called "false positives" in the image data captured by image sensor 14. A false positive occurs when circuitry 16 incorrectly determines that there is a near-field obstruction obstructing the field-of-view image sensor 14 when in reality no such obstruction is present. By selecting an appropriate pattern for light 38, processing circuitry 16 may mitigate any such false positives detected in the received image data.

Consider an example in which light source 36 constantly emits light of a single color (e.g., red light). In this example, any time image sensor 14 senses red light within its field-of-view, such as when vehicle 100 is stopped at a red light or when image sensor 14 detects a stop sign, circuitry 16 will detect the red light in the captured image data and determine that a near-field obstruction is present regardless of whether obstruction 34 is actually present. This would lead to the detection of a false positive when obstruction 34 is not present, as image sensor 14 would be incorrectly characterizing ambient red light (e.g., red light received from the scene) as being red light reflected off of a near-field obstruction from light source 36.

Therefore, to avoid such false positives, control and processing circuitry 16 may use light source 36 to emit light in a predetermined temporal and/or chromatic pattern. The predetermined pattern may include variations in time of the color of emitted light 38, the intensity of emitted light 38, the duration during which light 38 is emitted, or any other desired property of emitted light 38. As one example of such a predetermined pattern, light source 36 may emit red and blue light for a first time interval, no light for a second time interval subsequent to the first time interval, green light for a third time interval subsequent to the second time interval, and no light for a fourth time interval subsequent to the third time interval. This pattern may be repeated indefinitely during the operation of image sensor 14. Control and processing circuitry 16 may then process image data received from image sensor 14 and compare the image data over time to the predetermined pattern of light emitted from light source 36. If desired, circuitry 16 may determine that obstruction 34 is present when the same portion of the captured image data shows light of the predetermined pattern (e.g., when reflected light 40 received from the portion of field-of-view 30 in which obstruction 34 is located follows the predetermined temporal/chromatic pattern with which light 38 was emitted, circuitry 16 may identify that an obstruction is present and the portion of the field-of-view associated with the obstruction).

The pattern of light described in the example above is merely illustrative. In general, any desired pattern of light may be emitted from light source 36 for performing image sensor verification operations (e.g., for detecting obstructions in the field-of-view of the image sensor). The predetermined pattern may include colors of light varied at any suitable interval (e.g., less than a hundredth of a second, less than a tenth of a second, less than a second, or more than a second, etc.). Any suitable color or combination of colors may be variably emitted from light source 36 in any desired order. Light with any suitable intensity may be variably emitted from light source 36 in any desired order. In general, the more complex the predetermined pattern is, the higher degree of certainty the control and processing circuitry will have in determining the presence of a near-field obstruction (e.g., the less likely it is that image data showing the predetermined pattern with which light 38 is emitted is to be ambient light received from the surroundings of the vehicle). Similarly, the longer the pattern emitted is observed by the image sensor, the higher degree of certainty the control and processing circuitry may have in determining the presence of a near-field obstruction (e.g., as opposed to a false positive).

Light source 36 may include any desired light source such as one or more light emitting diodes (LEDs), one or more lasers, light sources with adjustable color filter elements, or any other device capable of emitting light. Additionally, the use of the term light source is not meant to be limiting in any way with respect to the number of light sources present. For example, light source 36 could include any number of light sources (e.g., two light sources, three light sources, four light sources, more than four light sources, ten light sources, etc.). In embodiments where there are multiple light sources, each light source may be capable of emitting a single color light or emitting multiple colors of light.

In scenarios where image sensor 14 is positioned behind protective layer 32, image sensor 14 may be positioned at a desired distance 42 behind the protective layer. Distance 42 may be, for example, less than 2 centimeters, between 2 and 10 centimeters, or greater than 10 centimeters. Near-field obstructions 34 may be defined herein as obstructions that are located less than approximately 50 centimeters from the image sensor (e.g., obstruction 34 may be located 2 centimeters from the image sensor, less than 10 centimeters from the image sensor, between 2 and 10 centimeters from the image sensor, less than 50 centimeters from the image sensor, etc.). By modulating light source 36 to emit a desired temporal/chromatic pattern of light 38, processing circuitry 16 may more accurately differentiate between reflected light 40 indicative of the presence of near-field obstruction 34 and ambient light received from the surroundings of system 10 (e.g., for mitigating false positives).

Figure 3:
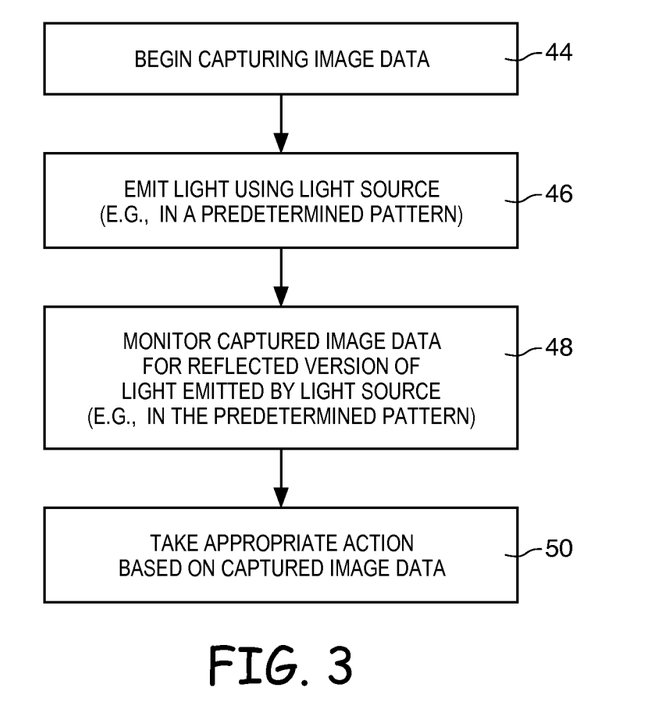
FIG. 3 is a flowchart of illustrative steps that may be used to perform near-field obstruction detection operations to verify proper operation of an imaging system of the type shown in FIGS. 1 and 2 in accordance with an embodiment of the present invention.

FIG. 3 is a flowchart of illustrative steps that may be performed by an imaging system with verification capabilities such as imaging system 10 of FIG. 2 (e.g., an automotive imaging system that captures image data for use in a vehicle safety system).

At step 44, an image sensor such as image sensor 14 may begin to capture image data. For example, image sensor 14 may capture a continuous sequence of frames of image data in response to light received in field-of-view 30. The captured image data may be processed by control and processing circuitry such as control and processing circuitry 16. The captured image data may be used in a vehicle safety system by a host subsystem such as host subsystem 20.

At step 46, a light source such as light source 36 may begin to emit light 38. Control and processing circuitry 16 may control light source 36 so that light source 36 emits light in a predetermined pattern (e.g., with a predetermined sequence of different colors of light). Control and processing circuitry 16 may actively adjust the pattern of light 38 emitted by light source 36, or light source 36 may always emit the same pattern of light. The pattern may include intervals of time with no light emitted and intervals of time with light of a certain color or various colors emitted.

At step 48, control and processing circuitry 16 may monitor image data captured by image sensor 14. For example, circuitry 16 may receive frames of image data captured by sensor 14 in response to light received over field-of-view 30. The image data may include image data (e.g., portions of a sequence of image frames) generated in response to light received from the surroundings of system 10 (e.g., from the street in which vehicle 100 is driving) and, if a near-field obstruction 34 is present in field-of-view 30, may include image data generated in response to reflected light 40. Circuitry 16 may process (analyze) the received image data to determine whether the received image data includes image data generated in response to reflected light 40 (e.g., a reflected version of light 38 emitted by light source 36). For example, control and processing circuitry 16 may determine whether the captured image data includes portions that match the pattern of light emitted by light source 36 over a predetermined period of time (e.g., milliseconds, seconds, or more than seconds). If circuitry 16 determines that the image data does not include any portions generated in response to reflected light 40 (e.g., portions having the predetermined pattern with which source 36 emitted light 38), circuitry 16 may determine that no obstructions are present and may continue to monitor the captured image data for obstructions. If circuitry 16 determines that the image data includes portions generated in response to reflected light 40 but only for a relatively short period of time (e.g., a period of time less than a predetermined threshold time), circuitry 16 may determine that no obstructions are present (e.g., the image data generated in response to reflected light 40 in this scenario may be reflected off of an object only temporarily within field-of-view 30 such as a passing bug or piece of debris).

If circuitry 16 determines that the image data includes portions generated in response to reflected light 40 (e.g., if circuitry 16 determines that the image data includes portions having the predetermined pattern as emitted by source 36) over the period of time, circuitry 16 may determine that near-field obstruction 34 is present and processing may proceed to step 50. If desired, control and processing circuitry 16 may determine a location in field-of-view 30 of image sensor 14 where the captured image data matches the light emitted by the light source (e.g., a portion of the captured image data that includes the obstruction).

At step 50, control and processing circuitry 16 may take appropriate action based on the captured image data. For example, control and processing circuitry 16 may disable the imaging system if the obstruction is determined to prevent the image sensor from obtaining a requisite minimum amount of image data from the surroundings of vehicle 100. In another suitable example, the control and processing circuitry may continue to operate the imaging system normally if the obstruction is determined to be small enough to not materially affect the operation of the image sensor. For example, processing circuitry 16 may discard or ignore portions of the captured image data in which the obstructions are located when using the image data to perform vehicle assist functions (e.g., the control and processing circuitry may continue to operate the imaging system normally if the obstruction is determined to be located in the periphery of the image sensor's field-of-view). As another example, control and processing circuitry 16 may indicate to a user that the imaging system needs inspection and/or repair (e.g., may issue display an alert to the user, may issue an audible alert, etc.). If desired, the imaging system may continue to be used for vehicle assist functions while the alert is issued.

Figure 4:
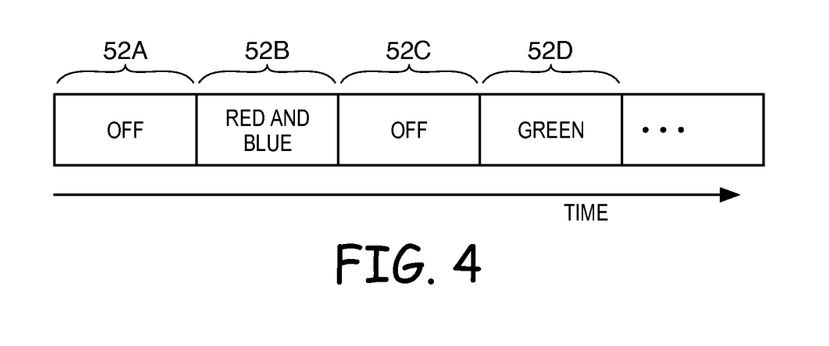
FIG. 4 is a diagram of an illustrative light modulation scheme that may be used by a light source of the type shown in FIG. 2 for performing imaging system verification operations in accordance with an embodiment of the present invention.

FIG. 4 is a diagram of an illustrative light modulation scheme that may be utilized by light source 36 for emitting light 38. Light source 36 may be turned off for a given duration (time frame) 52A. Red and blue light may be subsequently emitted for a given time frame 52B, after which light source 36 is turned off for a given time frame 52C. Green light may be subsequently emitted for a given time frame 52D. This pattern may be continuously repeated while imaging system 10 is in use by the vehicle. Processing circuitry 16 may analyze the captured image data to determine whether image data having a repeating pattern of light as given by time frames 52A-D has been captured and, in response to determining that image data has been captured matching the pattern of light described by time frames 52A-D, may take suitable action. Alternatively, this pattern may be repeated only intermittently to conserve power (e.g., once a minute, once every thirty seconds, once every two minutes, etc.). The red and blue light emitted in time frame 52B may be emitted from the same or a different light source as the green emitted in time frame 52D.

The example of FIG. 4 is merely illustrative. The length (duration) of time frames 52A, 52B, 52C, and 52D may be equal or different. For example, the length of time frames 52A, 52B, 52C, and 52D may all be equal to 1 second. Alternatively, the length of time frames 52A, 52B, 52C, and 52D may be equal to 1 second, 0.5 seconds, 1.2 seconds, and 2 seconds respectively. The length of time frames 52A, 52B, 52C, and 52D may be less than a hundredth of a second, less than a tenth of a second, less than a second, less than a minute, or more than a minute. The particular color(s) of light shown in time frames 52A, 52B, 52C, and 52D is merely illustrative. In general, any color of light may be emitted during each available time frame (e.g., any desired combination of red light, green light, blue light, orange light, yellow light, white light, ultraviolet light, purple light, infrared light, red and blue light, green and blue light, red and green light, etc.). The attribute that is changed in the emitted light in time frames 52A, 52B, 52C, and 52D is not required to be color. For example, the intensity of the light may be changed in each time frame. If desired, the intensity and color may be changed in any or all of the time frames.

Figure 5:
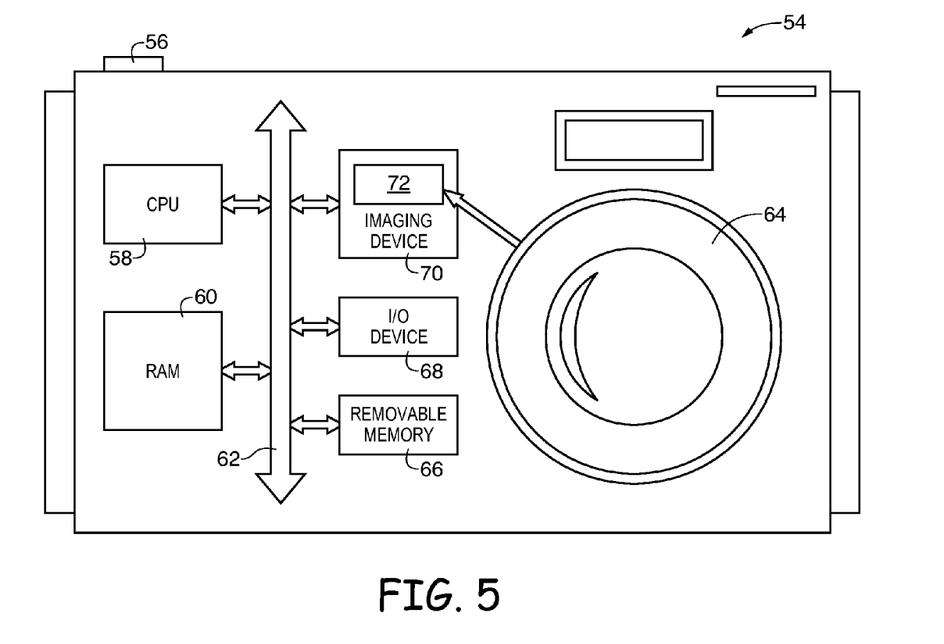
FIG. 5 is a block diagram of a system employing the embodiments of FIGS. 1-4 in accordance with an embodiment of the present invention.

FIG. 5 shows in simplified form a typical processor system 54, such as a digital camera, which includes an imaging device 70. Imaging device 70 may include a pixel array 72 formed on an image sensor SOC. Imaging device 70 may include a light source that modulates light. Pixel array may sense a reflection of the modulated light. The imaging device may subsequently determine that a near-field obstruction is present.

Processor system 54 is exemplary of a system having digital circuits that may include imaging device 70. Without being limiting, such a system may include a computer system, still or video camera system, scanner, machine vision, vehicle navigation, video phone, surveillance system, auto focus system, star tracker system, motion detection system, image stabilization system, and other systems employing an imaging device.

Processor system 54, which may be a digital still or video camera system, may include a lens such as lens 64 for focusing an image onto a pixel array such as pixel array 72 when shutter release button 56 is pressed. Processor system 54 may include a central processing unit such as central processing unit (CPU) 58. CPU 58 may be a microprocessor that controls camera functions and one or more image flow functions and communicates with one or more input/output (I/O) devices 68 over a bus such as bus 62. Imaging device 70 may also communicate with CPU 58 over bus 62. System 54 may include random access memory (RAM) 60 and removable memory 66. Removable memory 66 may include flash memory that communicates with CPU 58 over bus 62. Imaging device 70 may be combined with CPU 58, with or without memory storage, on a single integrated circuit or on a different chip. Although bus 62 is illustrated as a single bus, it may be one or more buses or bridges or other communication paths used to interconnect the system components.

Various embodiments have been described illustrating an imaging system and a method of operating an imaging system. An imaging system may include an image sensor that captures image data in response to light received over a field-of-view of the image sensor. The imaging system may include a transparent protective layer that is formed within the field-of-view of the image sensor. The imaging system may also include a light source that emits light in a predetermined pattern, and processing circuitry that detects portions of the image data captured by the image sensor in response to the light emitted by the light source in the predetermined pattern. The processing circuitry may identify an obstruction on the transparent protective layer in response to detecting portions of the image data captured by the image sensor that correspond to the light emitted by the light source in the predetermined pattern. The obstruction may be within 10 centimeters of the image sensor.

The transparent protective layer may be made of glass and may be formed within 10 centimeters of the image sensor. The transparent protective layer may be the windshield for a vehicle. The imaging system may include a host subsystem that uses captured image data from the image sensor to perform vehicle assist functions such as a parking assist function, a cruise control function, an auto-braking function, a collision avoidance function, or a lane keeping function. The predetermined pattern emitted by the light source may be a predetermined temporal and chromatic pattern.

A method of operating an imaging system (e.g., imaging system 10) may include capturing image data over a field-of-view of an image sensor, emitting light with a light source, using processing circuitry to determine whether the captured image data includes a portion of image data generated in response to the reflected version of the emitted light, and identifying that there is an obstruction in the field-of-view of the image sensor using the processing circuitry.

In various embodiments, the imaging system may be an automotive imaging system that also performs vehicle assist functions. Processing circuitry may be used to determine the location and size of an obstruction using the captured image data. Processing circuitry may be used to disable at least one of the vehicle assist functions in response to determining the location and size of the obstruction. Alternatively, the processing circuitry may compare the determined size to a predetermined threshold size and continue to perform the vehicle assist functions if the determined size is less than the predetermined threshold size. The processing circuitry may also determine that the obstruction is located at a periphery of the field-of-view of the image sensor and continue to perform vehicle safety functions. The processing circuitry may notify a user of the vehicle that the obstruction is present in the field-of-view of the image sensor.

Emitting the light may include emitting the light in a predetermined pattern. The predetermined pattern may include turning the light source off for a first time period, emitting light of a first color for a second time period subsequent to the first time period, turning the light source off for a third time period subsequent to the second time period, and emitting light of a second color that is different than the first color for a fourth time period subsequent to the third time period.

In various embodiments, a system may include a vehicle with an interior and exterior, a central processing unit, memory, input-output circuitry, an imaging device mounted at the interior of the vehicle that captures image data, a transparent protective layer separating the imaging device form the exterior of the vehicle, and a light source mounted at the interior of the vehicle. The imaging device may face the exterior of the vehicle. The light source may emit a predetermined pattern of light. The central processing unit may be able to detect a near-field obstruction of the image sensor by identifying reflections of the predetermined pattern of light in the captured image data.

The foregoing is merely illustrative of the principles of this invention which can be practiced in other embodiments.

What is claimed is:

1. A method of operating an automotive imaging system having an image sensor, a light source, and processing circuitry, the method comprising:
    with the image sensor, capturing image data over a field-of-view of the image sensor;
    with the processing circuitry, performing a vehicle assist function using the captured image data;
    with the light source, emitting light in a predetermined pattern, wherein emitting light in the predetermined pattern comprises emitting light of a first color for a first time period and emitting light of a second color that is different than the first color for a second time period subsequent to the first time period;
    with the processing circuitry, determining whether the captured image data includes a portion of image data generated in response to a reflected version of the predetermined pattern of emitted light; and
    with the processing circuitry, identifying that there is an obstruction present in the field-of-view of the image sensor in response to determining that the captured image data includes the portion of image data generated in response to the reflected version of the predetermined pattern of emitted light.

2. The method defined in claim 1, further comprising:
    with the processing circuitry, determining a location and a size of the obstruction within the captured image data.

3. The method defined in claim 2, further comprising:
    with the processing circuitry, comparing the determined size of the obstruction to a predetermined threshold size; and
    in response to determining that the size of the obstruction is less than the predetermined threshold size, continuing to perform the vehicle assist function using the captured image data.

4. The method defined in claim 2, wherein the field-of-view has a periphery, the method further comprising:
    with the processing circuitry, determining whether the location of the obstruction is at the periphery of the field-of-view; and
    in response to determining that the location of the near-field obstruction is at the periphery of the field-of-view, continuing to perform the vehicle assist function using the captured image data.

5. The method defined in claim 2, further comprising:
    with the processing circuitry, notifying a user of the vehicle that the obstruction is present in the field-of-view of the image sensor in response to determining the location and size of the obstruction.

6. The method defined in claim 1, wherein identifying that there is an obstruction present in the field-of-view of the image sensor comprises:
    identifying that there is an obstruction present within 10 centimeters of the image sensor.

7. The method defined in claim 1, further comprising:
    disabling the vehicle assist function in response to identifying that there is an obstruction present in the field-of-view of the image sensor.

8. The method defined in claim 1, further comprising:
    altering the vehicle assist function in response to identifying that there is an obstruction present in the field-of-view of the image sensor.

9. The method defined in claim 1, wherein performing the vehicle assist function comprises performing a vehicle safety system function selected from the group consisting of: a parking assistance function, a cruise control function, an auto-braking function, a collision avoidance function, a pedestrian detection function, and a lane keeping function.

10. An imaging system, comprising:
    an image sensor configured to capture image data in response to light received over a field-of-view of the image sensor;
    a transparent protective layer formed within the field-of-view of the image sensor;
    a light source configured to emit light in a predetermined pattern;
    processing circuitry configured to detect portions of the image data captured by the image sensor in response to the light emitted by the light source in the predetermined pattern and configured to identify an obstruction on the transparent protective layer in response to detecting the portions of the image data; and a host subsystem configured to perform a vehicle assist function for the vehicle using the captured image data, wherein the vehicle assist function comprises a vehicle safety system function selected from the group consisting of: a parking assistance function, a cruise control function, an auto-braking function, a collision avoidance function, a pedestrian detection function, and a lane keeping function.

11. The imaging system defined in claim 10, wherein the transparent protective layer comprises glass.

12. The imaging system defined in claim 10, wherein the transparent protective layer is formed within 10 centimeters from the image sensor.

13. The imaging system defined in claim 10, wherein the transparent protective layer comprises a windshield for a vehicle.

14. The imaging system defined in claim 13, wherein the predetermined pattern comprises a predetermined temporal and chromatic pattern.

15. A system, comprising:
a vehicle with an interior and an exterior;
a central processing unit;
memory;
input-output circuitry;
an imaging device configured to capture image data, wherein the imaging device is mounted at the interior of the vehicle and oriented to face the exterior of the vehicle, wherein the imaging device comprises a single image sensor that captures image data;
a host subsystem configured to perform vehicle assist functions for the vehicle using the captured image data, wherein the vehicle assist functions comprise a vehicle safety system function selected from the group consisting of: a parking assistance function, a cruise control function, an auto-braking function, a collision avoidance function, a pedestrian detection function, and a lane keeping function;
a transparent protective layer separating the imaging device from the exterior of the vehicle; and
a light source mounted at the interior of the vehicle, wherein the light source is configured to emit a predetermined pattern of light and wherein the central processing unit is configured to detect a near-field obstruction of the single image sensor by identifying reflections of the predetermined pattern of light in the captured image data.

16. The system defined in claim 15, wherein the near-field obstruction comprises a physical object within a field-of-view of the imaging device, wherein the physical object is located on the exterior of the vehicle, and wherein the physical object is located within 10 centimeters of the imaging device.

* * * * *